Patented June 19, 1951

2,557,653

UNITED STATES PATENT OFFICE 2,557,653

WATER-REPELLENT COMPOSITION STABILIZED WITH A TERTIARY HETEROCYCLIC AROMATIC AMINE

Larry Quentin Green, Wilmington, Del., assignor to E. I. du Pont de Nemours and Company, Wilmington, Del., a corporation of Delaware No Drawing. Application December 23, 1949, Serial No. 134,848

2 Claims. (Cl. 260—30.2)

This invention relates to a water-repellent composition having improved stability in dilute aqueous solutions, and to a method for preparing the same. The invention relates more particularly to a water-repellent composition of the type more particularly disclosed in co-pending application of Pikl, Serial No. 764,913 filed July 30, 1947, now U. S. Patent 2,505,649, but which has improved stability in dilute aqueous solutions and under conditions normally employed in applying these water-repellent compositions to textile fibers.

The water-repellent composition as prepared according to the process of co-pending application Serial No. 764,913, now U. S. Patent 2,505,649, as more particularly illustrated by one of the examples of that application which is given herein, has been found at times to show some instability in the dilute aqueous treating bath. This instability shows up as agglomerations of solids which lead to spots and inferior water-repellency on the treated fabrics, and, in some cases under the particular conditions of use, become entirely unsuitable for the purpose intended. The water-repellent composition in the paste form, as manufactured according to the process of co-pending application Serial No. 764,913, now U. S. Patent 2,505,649, is slightly acid due to the presence of the hydrochlorides of the tertiary bases contained therein, and only when this acidity is reduced, such as by the addition of sodium acetate or other alkali which is often required in the treating baths, is the instability noted.

It is an object of the present invention to improve the stability of water-repellent compositions of the type more particularly illustrated in co-pending application Serial No. 764,913, now U. S. Patent 2,505,649, with regard to their precipitation in dilute aqueous treating solutions which have been treated with alkalis or alkaline salts to reduce their acidity. It is a further object of the invention to produce water-repellent compositions which are quaternary pyridinium salts by incorporating into the solutions an excess of pyridine.

The water-repellent compositions with which the present invention is particularly concerned are those of co-pending application Serial No. 764,913, now U. S. Patent 2,505,649, and which may be prepared as follows:

Example A 190 parts of anhydrous isopropyl alcohol containing 2.5 parts of hydrogen chloride are heated to 70° C. and then 370 parts of methylol stearamide flakes are added. The reaction mass is now heated in the course of 2 to 3 hours to 68° C. During this period, part of the methylol stearamide is converted to the isopropyl ether; another portion, to the stearamido-methylene ether of methylol stearamide, a compound melting at 108° C.; some methylol stearamide remains unchanged, while a small portion changes to methylene distearamide.

A mixture of 56 parts of partially polymerized methylol melamines (trimethylol or tetramethylol melamine), 105 parts of isopropyl alcohol and 19 parts of hydrogen chloride is then added. The reaction mixture is heated for ½ to 2 hours at 68° to 72° C. to effect the reaction of the polymethylol melamine with the ethers of methylol stearamide. 50 parts of pyridine are then added; this forms first the hydrogen chloride salt, which in turn reacts with residual methylol groups of the resins and resin-methylol condensation product giving quaternary pyridinium salts. The reaction with pyridine hydrochloride is finished in ½ to 1½ hours. There are then added 180 parts of stearamido-methyl-pyridinium chloride, which serves as a dispersing agent and also contributes to the water-repellent finish which is obtained when the product is applied to fabrics.

These water-repellent agents are of complex composition and contain methylene distearamide, a complex condensation product of methylol stearamide with methylol melamine, the quaternary pyridinium salts of the methylol stearamide, and the quaternary pyridinium salts of the complex condensation product of the methylol stearamide with methylol melamine.

In general these compositions contain from 40% to 50% of insoluble material, the remaining part of the paste being an alcohol containing a very small amount of free pyridine after neutralization of all hydrochloric acid is completed. According to the present invention, the stability of these water-repellent compositions when made up as aqueous dispersions is significantly increased by incorporating in the paste from 2½% to 12% of free pyridine, based on the total weight of the water-repellent composition, including the alcohol. The amount of pyridine required will depend on the original stability of the paste, which in turn depends on the purity of the starting materials employed and the conditions under which the reaction was carried out.

In determining the degree of stability of these water-repellent compositions and to insure reproduceable and reliable determinations of their pad-bath stability when employed in dilute aqueous solutions, the following test has been adopted and in the following tables the values given are those that are reproduceable by this test. In certain examples other tests were employed and are described therein.

To 25 grams of the water-repellent paste, such as produced in the above Example A, in a 500 cc. tall form beaker is added 25 cc. of water at 125° F. After stirring for 2 minutes another 25 cc. portion of water is added with continuous stirring. After each of three more 2-minute intervals there are added 50 cc., 50 cc. and 75 cc. portions of water, respectively. This operation results in a suspension containing 10% of the original water-repellent paste. After the suspension has stood 30 minutes, 8.75 cc. of a 50% solution of sodium acetate ($CH_3CO_2Na \cdot 3H_2O$) is added with stirring. The suspension is then filtered immediately through a 325 mesh screen, loaded into an Ostwald viscometer tube (such as the one described in "A Monograph of Viscometry," by Barr, Oxford University Press, London, 1931—see "A," Fig. 21, page 119) which is immersed in a constant temperature bath held at 110° F. The zero time for measuring stability is taken at the time of the sodium acetate addition. The efflux time for movement of the suspension through the tube is recorded periodically. When the efflux time is plotted graphically against the elapsed time, an inflection in the curve shows the point at which the pad bath begins to coagulate.

The following examples are given to illustrate the invention. The parts and percentages employed are by weight unless otherwise specified.

Example 1

A batch of water-repellent composition prepared essentially according to the process of Example A above, when tested for stability in the manner above described had a stability of one hour. When 3% of pyridine, based on the weight of the total water-repellent composition, was stirred into another sample of the same batch of water-repellent composition, the pad-bath stability was increased to 1½ hours.

Example 2

To show the extent of stabilization imparted to various lots of the water-repellent compositions having different stabilities, various amounts of pyridine were incorporated into the same and different batches of the water-repellent according to the method described in Example A. The results of these tests are as follows:

| Batches | Stability before treatment | Pyridine Added | Stability after treatment |
|---|---|---|---|
|  | Hours | Per cent by weight | Hours |
| A | ½ | 10 | 1¾ |
| B | 1 | 7 | 2½ |
| B | 1 | 10 | 2½ |
| C | 1¼ | 5 | 2 |
| D | 1¼ | 10 | 2½ |
| E | 1½ | 5 | 2 |
| F | 1½ | 5 | 2½ |
| G | 1¾ | 3 | 2½ |
| H | 1¾ | 4 | 2½ |

(Batch B in this example is the same as employed in Example 1.)

Example 3

Pyridine will sabilize this water-repellent even when the composition is melted in the presence of air, which usually has an adverse effect on its stability. Several different batches of the water-repellent were melted by heating at 60° C. for about ½ hour and pyridine was added in the amounts shown, based on the weight of the repellent composition employed. The results are as follows:

| Stability before treatment | Pyridine Added | Stability after treatment |
|---|---|---|
| Hours | Per cent by weight | Hours |
| 1 | 7 | 2½ |
| 1¾ | 4 | 2½ |
| 1¼ | 7 | 2½ |

Example 4

It has been found that quinoline will stabilize the water-repellent composition satisfactorily. Quinoline was incorporated into several batches of the water-repellent by the method described in Example 1, with the following results:

| Stability before treatment | Quinoline Added | Stability after treatment |
|---|---|---|
| Hours | Per cent by weight | Hours |
| 1 | 4 | 2 |
| 1¼ | 7 | 1¾ |

The following examples show that pyridine stabilizes aqueous solutions of varius ingredients of the above-described water-repellent compositions.

Example 5

To 50 cc. of a methanol-water mixture (1:1) was added 1.0 gram of stearamido-methylpyridinium chloride (U. S. Patent 2,146,392). On warming to 40° C. for several minutes, complete solution resulted. One-half of this solution was added to another test tube containing 1 cc. of pyridine. Both tubes were placed in a water-bath at 110° F. Initially both solutions were clear. After one hour the solution containing pyridine was still clear and transparent but the other one had become opaque. This indicated undesirable decomposition of the type encountered in unstable pad-baths containing this material.

Example 6

A pyridine quatenary salt was prepared in the following manner: To 75 grams of an isopropyl alcohol-hydrogen chloride solution (21% HCl) in a 500 cc. flask fitted with a thermometer and agitator was added 45 grams of a methylol melamine ("Parez Paper Resin" #605) with vigorous mechanical stirring. An immediate exothermic reaction occurred, causing the temperature of the reaction mixture to rise from 26° C. to 38° C. The resultant slurry was warmed to 40° C. by means of a warm water bath, and held there for 5 minutes. The slurry was then rapidly cooled to 30° C. and there was added slowly from a dropping funnel 36 grams of pyridine. The temperature was not allowed to rise over 35° C. during the addition. The reaction mixture was then permitted to stand for one day to permit any unreacted or highly polymerized resin to settle out. The supernatant liquid contains in solution the pyridinium quaternary salt of the methylol melamine resin. Four grams of this supernatant solution were added to 20 cc. of water and sufficient isopropyl alcohol (7 cc.) was added to give a clear, transparent, colorless solution. This solution was then divided into two equal parts, and to one portion was added 1 cc. of pyridine. The two solutions were then placed in a constant temperature bath at 43° C. After a period of 20 hours the solution containing the pyridine was still clear and transparent, whereas the other solution was heavily opaque in appearance, indicating hydrolysis of the resin quaternary and formation of the insoluble resin. The solution containing the added pyridine was still clear and transparent 7 hours later, and when finally discarded no sedimentation had appeared.

When a sample of the above clear solution was treated with ammonium hydroxide to accelerate the rate of hydrolysis or precipitation, the sample not containing the pyridine became opaque in 5 minutes, whereas the pyridine-containing mixture remained clear and transparent.

Although a specific example of the water-repellent composition is given for the purpose of exemplifying this invention, it is to be understood that the present invention is applicable to the water-repellent compositions disclosed in copending application Serial No. 764,913, now U. S. Patent 2,505,649. These water-repellent compositions will be generally referred to as quaternary pyridium salts of methylol melamine-methylol fatty acid amide condensation mixture.

As disclosed in that case, these compositions may be obtained by reacting methylol stearamide, a water-soluble alcohol, such as isopropyl alcohol, with from 4.5% to 36% of the melamine resin, in the presence of from 0.5 to 4 mols of hydrochloric acid per mol of melamine resin employed. The Methylol stearamide or other saturated fatty acid amides containing from 14 to 22 carbon atoms may be employed in the pure form, although usually they will be employed as commercial products such as those obtained from the normally occurring long chain saturated fatty acid mixtures. Any of the water soluble primary or secondary alcohols may be used in place of the isopropyl alcohol of the example, or such other solvents as are described in application Serial No. 764,913, now U. S. Patent 2,505,649.

The stability of the water-repellent composition with which the present invention is concerned varies apparently due to non-uniformity of the reagents employed, variations in heating conditions, etc., and even under the most carefully controlled laboratory conditions it is found that some batches, when diluted with water as required in their use on textiles, are not sufficiently stable to assure obtaining textile treated fabrics which are entirely satisfactory.

I have found that even those batches which show the poorer stability can be given satisfactory stability by the addition of from 10% to 12% of pyridine, based on the weight of the water-repellent composition itself. In all batches of these water-repellents tried, the presence of from 2½% to 12% of free pyridine has been found to give significant improvements in the stability of the product when diluted with water.

In general those tertiary heterocyclic aromatic amines containing from 5 to 10 carbon atoms, such as quinoline, the picolines, isoquinoline, ethyl pyridine, quinaldine, etc., when added, improve the stability of these textile treating agents. Pyridine itself is preferred.

The desired improvement in stability can be obtained either by adding the excess of the tertiary heterocylic amine directly to the water-repellent composition as it is prepared, by stirring it into the paste after its preparation either at room temperature or at slightly elevated temperatures such as 60° C. where the paste is more fluid, or even by adding it to the dilute textile treating bath.

In general, the pad-bath stability of the water-repellent compositions to which the present invention relates, when measured by the method described above, can be improved from 50% to 250% of their original value. Amounts larger than 12% of free pyridine may of course be employed, but tend to unnecessarily increase the cost of the resulting product.

I claim:

1. A water-repellent composition, being an alcohol dispersion of quaternary pyridinium salts of a methylol melamine-methylol fatty acid amide condensation mixture obtained by condensing a methylol fatty acid amide with from 4.5% to 36% by weight of methylol melamine in an alcohol solution of from 0.5 to 4 mols of hydrochloric acid per mol of methylol melamine employed, the alcohol employed in the dispersion being of the class consisting of water soluble primary and secondary alcohols, said composition containing from 2½% to 12% of free tertiary heterocyclic aromatic amine containing from 5 to 10 carbon atoms and from 40% to 50% of said condensation mixture.

2. A water-repellent composition, being an alcohol dispersion of quaternary pyridinium salts of a methylol melamine-methylol fatty acid amide condensation mixture obtained by condensing a methylol fatty acid amide with from 4.5% to 36% by weight of methylol melamine in an alcohol solution of from 0.5 to 4 mols of hydrochloric acid per mol of methylol melamine employed, the alcohol employed in the dispersion being of the class consisting of water soluble primary and secondary alcohols, said composition containing from 2½% to 12% of free pyridine and from 40% to 50% of said condensation mixture.

LARRY QUENTIN GREEN.

REFERENCES CITED

The following references are of record in the file of this patent:

UNITED STATES PATENTS

| Number | Name | Date |
|---|---|---|
| 2,505,649 | Pikl | Apr. 25, 1950 |